(12) United States Patent
Davis (10) Patent No.: US 7,316,354 B2
(45) Date of Patent: Jan. 8, 2008

(54) METHOD AND SYSTEM FOR VOICE ENABLING AN AUTOMATED STORAGE SYSTEM

(75) Inventor: Michael Davis, White Oak, PA (US)

(73) Assignee: Vocollect, Inc., Pittsburgh, PA (US)

( * ) Notice: Subject to any disclaimer, the term of this patent is extended or adjusted under 35 U.S.C. 154(b) by 594 days.

(21) Appl. No.: 10/798,466

(22) Filed: Mar. 11, 2004

(65) Prior Publication Data

US 2005/0200632 A1 Sep. 15, 2005

(51) Int. Cl.
G06F 17/60 (2006.01)
(52) U.S. Cl. .................. 235/462.01; 235/385
(58) Field of Classification Search ........... 235/385, 235/383, 462.01, 462.13
See application file for complete search history.

(56) References Cited

U.S. PATENT DOCUMENTS

| 4,812,629 | A | * | 3/1989 | O'Neil et al. ............... 235/383 |
| 4,866,661 | A | * | 9/1989 | de Prins ..................... 235/382 |
| 4,882,475 | A | | 11/1989 | Miller et al. |
| 5,083,638 | A | * | 1/1992 | Schneider ................... 186/61 |
| 5,455,409 | A | | 10/1995 | Smith et al. |
| 5,609,223 | A | | 3/1997 | Iizaka et al. |
| 5,664,113 | A | | 9/1997 | Worger et al. |
| 5,780,826 | A | | 7/1998 | Hareyama et al. |
| 5,786,764 | A | | 7/1998 | Engellenner |
| H1743 | H | | 8/1998 | Graves et al. |
| 5,873,070 | A | | 2/1999 | Bunte et al. |
| 5,890,130 | A | | 3/1999 | Cox et al. |
| 5,913,163 | A | * | 6/1999 | Johansson ................ 455/426.1 |
| 5,917,175 | A | | 6/1999 | Miller et al. |
| 5,926,090 | A | | 7/1999 | Taylor et al. |
| 5,965,961 | A | | 10/1999 | Lampe |
| 6,003,771 | A | | 12/1999 | Kusters |
| 6,057,756 | A | * | 5/2000 | Engellenner ............... 340/505 |
| 6,131,808 | A | * | 10/2000 | Pires et al. ................ 235/375 |
| 6,133,832 | A | | 10/2000 | Winder et al. |
| 6,264,104 | B1 | * | 7/2001 | Jenkins et al. ............. 235/383 |
| 6,285,916 | B1 | | 9/2001 | Kadaba et al. |
| 6,297,737 | B1 | | 10/2001 | Irvin |
| 6,353,387 | B1 | | 3/2002 | Kusters |
| 6,388,569 | B1 | | 5/2002 | Engellenner |
| 6,439,345 | B1 | | 8/2002 | Recktenwald et al. |
| 6,512,919 | B2 | | 1/2003 | Ogasawara |
| 6,522,722 | B1 | | 2/2003 | Francke |
| 6,600,418 | B2 | | 7/2003 | Sainati et al. |
| 6,891,469 | B2 | * | 5/2005 | Engellenner ............... 340/505 |
| 6,892,941 | B2 | * | 5/2005 | Rosenblum ................ 235/383 |
| 2001/0049629 | A1 | | 12/2001 | Freeman |
| 2001/0052544 | A1 | | 12/2001 | Nishitani et al. |
| 2002/0008621 | A1 | | 1/2002 | Barritz et al. |
| 2002/0017992 | A1 | | 2/2002 | Hidaka et al. |

(Continued)

Primary Examiner—Daniel Stcyr
(74) Attorney, Agent, or Firm—Wood, Herron & Evans, LLP (57) ABSTRACT

An automated storage system provides a two-way wireless interface between an operator and the computer and database system that identifies where items are located. Accordingly, while the operator is located adjacent a storage unit, the operator can query the database system for an item location via speech input and receive audio output of that location. As a result, the operator does not need to remember the location information while traveling between the computer and the storage unit and the operator is able to perform multiple operations with the storage unit without returning to the computer in-between each operation.

26 Claims, 3 Drawing Sheets

U.S. PATENT DOCUMENTS

| | | |
|---|---|---|
| 2002/0070846 A1 | 6/2002 | Bastian, II et al. |
| 2002/0070862 A1 | 6/2002 | Francis et al. |
| 2002/0195491 A1 | 12/2002 | Bunch, III |
| 2003/0001007 A1 | 1/2003 | Lee et al. |
| 2003/0020629 A1 | 1/2003 | Swartz et al. |
| 2003/0025602 A1 | 2/2003 | Medema et al. |
| 2003/0036985 A1 | 2/2003 | Soderholm |
| 2003/0137424 A1 | 7/2003 | Gehlot et al. |
| 2003/0151507 A1 | 8/2003 | Andre et al. |

* cited by examiner

METHOD AND SYSTEM FOR VOICE ENABLING AN AUTOMATED STORAGE SYSTEM

TECHNICAL FIELD

The present invention relates to automated storage systems and, more particularly, voice-enable storage systems.

BACKGROUND ART

Automated storage systems have recently been used in a variety of logistical applications to improve the efficiency and reliability of warehousing items such as, for example, manufacturing parts, paper files, and laboratory specimens. Such storage systems typically include one or more storage units having a mechanized carousel that is comprised of a number of bins or storage locations. Carousels may be arranged vertically or horizontally and a wide variety of bin shapes and arrangements are presently utilized. The mechanized carousel moves so as to position a particular bin at an opening of the unit that is accessible by an operator. Once the carousel is in that location, the operator can retrieve an item from the bin or place an item in the bin.

A computer system is often involved with automated storage systems to maintain a database of where items are located in the system and the quantity of those items as well. In operation, the operator uses an interface of the computer system to query the database to identify where an item is located or should be located. With this information, the operator travels from the computer system to the appropriate automated storage unit and retrieves (or deposits) the item. In some instances, the computer system controls the storage unit to automatically position the carousel so as to present the correct bin to the operator. In other instances, the operator must use the storage unit controls to position the appropriate bin at the opening.

In large logistical facilities, one computer system may service a number of different storage units. Accordingly, the computer system may not be located adjacent to the different automated storage units. Thus, after an operator travels to the computer system and retrieves the database information about an item, the operator must then travel to the correct storage unit, remember the location information, and retrieve the intended item. This approach to utilizing automated storage units has significant drawbacks. For example, once a location has been identified, an operator is required to correctly remember the location of the item within the automated storage system that may have hundreds or thousands of different items and locations. Even when a carousel automatically positions itself under control of the computer system, the opening does not just include one bin; but, instead, presents a shelf of different bins from which the operator must remember the correct location. Additionally, the operator is required to travel back and forth between the computer system and the different storage units when retrieving multiple items. Accordingly, a need presently exists for an interface to automated storage systems that increases the efficiency and reliability with which these systems can be used.

BRIEF DESCRIPTION OF THE DRAWINGS

The accompanying drawings, which are incorporated in and constitute a part of this specification, illustrate embodiments of the invention and, together with the detailed description of the embodiments given below, serve to explain the principles of the invention.

DETAILED DESCRIPTION OF SPECIFIC EMBODIMENTS

Figure 1:
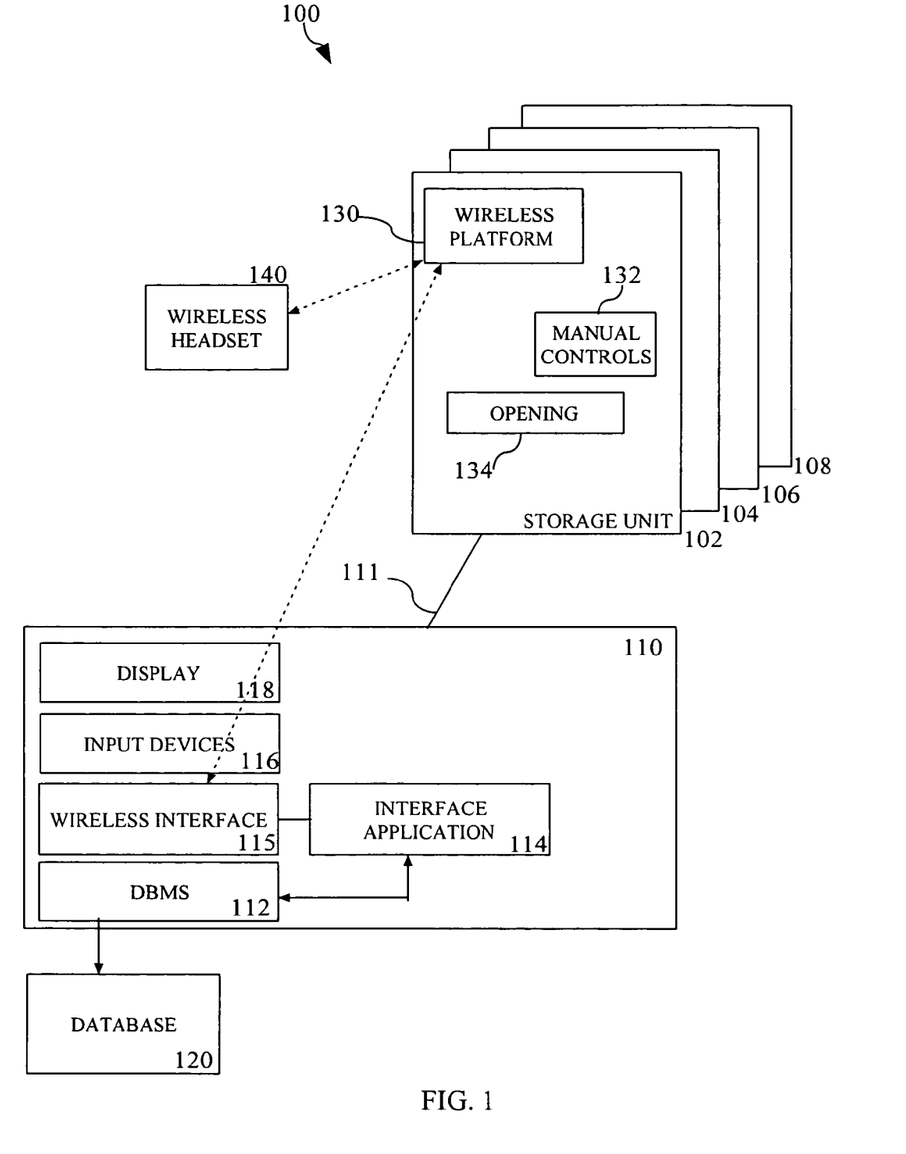
FIG. 1 illustrates an exemplary automated storage system in accordance with principles of the present invention.

FIG. 1 illustrates an exemplary automated storage system in accordance with principles of the present invention. In use, a manufacturer, supplier or warehouser stores a number of different items within the automated storage systems. Personnel, or operators, interact with the automated storage system to retrieve one or more items from the system and to place (or re-place) items within the system. Such systems are used in a wide variety of applications ranging from storing automotive parts or electrical parts to storing paper files.

The automated storage system 100 includes a number of individual automated storage units 102-108. In certain embodiments of the present invention, these units 102-108 may be considered as a group to form a single storage system and, in alternative embodiments, each unit 102-108 is considered as a stand-alone automated storage unit. Additionally, other groups of storage units (not shown) may be present as well within a large warehouse or other logistical environment.

Each of the storage units 102-108 include features and capabilities that are conventionally attributed to automated storage units. For example, each unit 102-108 may have a vertical or horizontal carousel or conveyor that is appropriately sized for the number and size of the items that are stored in the units 102-108. Attached to the carousel or other conveyor mechanism are bins or slots (not shown) that move when the carousel moves. The storage units 102-108 usually have an enclosure covering the bins and carousel but include an opening 134 that is accessible to an operator. Using controls 132 on the unit 102, the operator causes the carousel to move so that a desired bin is positioned within the opening 134. Once the desired bin is available, the operator may place an item in the bin or retrieve an item from the bin. Embodiments of the present invention contemplate using any of the variety of automated storage units that are conventionally known in the art. The present invention is not, therefore, limited to a particular type of carousel or conveyor, a particular type of bin, a particular control interface, only self-positioning units, only manually-positioned units, or a specific logistical or warehouse application.

The storage units 102-108 are typically connected with a computer 110 via a network connection or other communications interface 111. Using such a communications medium, the computer 110 is able to receive information from the units 102-108 and also to send control information to the units 102-108. Embodiments of the present invention contemplate storage units that are connected with a computer 110 and storage units that are not directly connected with a computer. As would be apparent to one of ordinary skill, the computer 110 may be implemented with a number of different features and architectures without departing from the scope of the present invention.

The computer 110 is usually located nearby the storage units 102-108 but not necessarily directly adjacent the units 102-108. The computer 110 is considered to be the controller for the storage units 102-108 and provides a user interface to the inventory management of the storage units 102-108. For example, a database 120 is maintained that includes information such as what items are stored within the storage units 102-108 and where exactly these items are stored such as a specific bin or other sub-component. Other information likely included in the database 120 may be the quantity of each item in the storage units 102-108. In FIG. 1, the database 120 is depicted as being directly connected or coupled with the computer 110; however, other alternatives are possible. For example, the database 120 may be maintained at a remote location and coupled with the computer 110 via a LAN or WAN connection.

The computer 110 may support a number of software applications, some of which are only peripherally related to the principles of the present invention. One application, however, that is integrally related is a database management system 112. As conventionally recognized, the DBMS includes routines and functions that query the database 120 and receive responses back from the database 120. The DBMS 112 also includes a front-end or user interface that permits an operator to interact with the DBMS 112. In some instances, an operator can use standard input devices 116 (e.g., keyboard, mouse, trackball, etc.) to provide input to the DBMS 112. In response, the DBMS will provide appropriate output such as through a display 118.

In accordance with one embodiment of the invention, in addition to the standard input devices 116 and display 118, the computer 110 provides wireless interfacing with the DBMS 112. In particular, a software application 114 operates in conjunction with the DBMS 112 to act as a source of input to the front-end of the DBMS 112 and also to forward responses, received from the DBMS 112, out a wireless connection 115. One of ordinary skill will readily recognize that the application 114 may be implemented as a stand-alone program or as a routine integrated within the DBMS 112. In operation, data is received from the wireless interface 115, the application 114 relays the data to the DBMS 112, waits for a response from the DBMS 112, and then forwards that response to the wireless interface 115. In this way, the computer 110 includes conventional input and output functionality associated with automated storage units but, in addition, is augmented with a wireless-based interface that permits an operator to utilize the computer 110 without being physically present at the computer 110. One commercially available example of interface application 114 is distributed by the present assignee Vocollect under the name Talkman VoiceLink™.

A wireless computer platform 130 is located at a storage unit 102 that communicates with the computer 110. The computer platform 130 also interfaces with a headset 140 that is worn by an operator and interfaces with the computer 110. As a result, voice input from an operator may be received via the headset 140 and forwarded to the computer 110. Similarly, data from the computer 110 can be received by the computer platform 130 and forwarded to the headset 140 as audio output.

Figure 2:
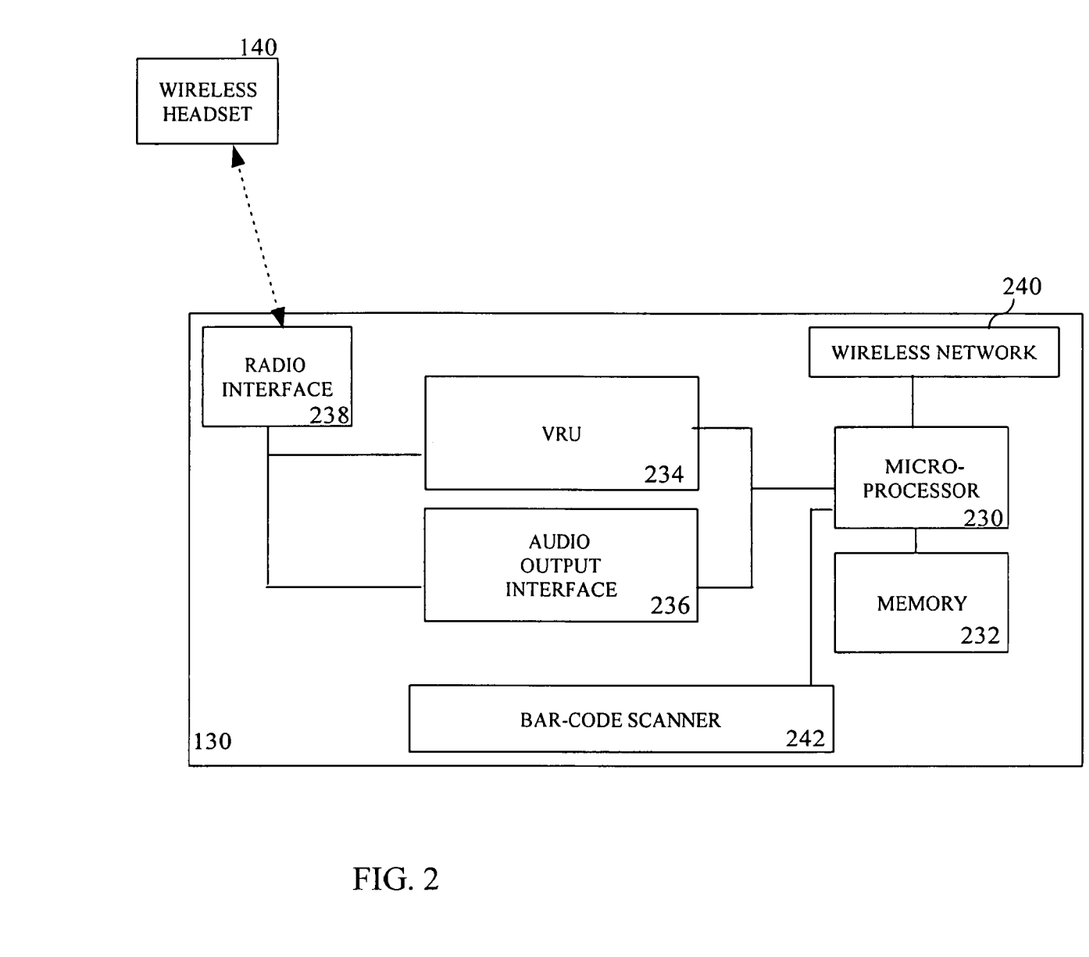
FIG. 2 illustrates an exemplary computer platform located at a storage unit that provides wireless voice communications.

A more detailed view of the components within the computer platform 130 is depicted in FIG. 2. One example of a computer platform similar to that of FIG. 2 is the Talkman® T2 manufactured and distributed by the current assignee, Vocollect. That platform includes Windows CE 7 operating on an Intel-based processor and provides various wireless communications functions. Unlike the present invention, however, the Talkman® T2 is a user-wearable computer that is attached, for example, at a person's belt and communicates with a wireless headset also worn by the person.

According to the principles of the present invention, the computer platform 130 is attached to one or more storage unit 102-108 and ultimately provides a communications path between an operator using the automated storage system and the database 120. As such, the platform 130 may advantageously be powered through the storage units 102-108. The platform 130 includes a microprocessor 230 or other controller and system memory 232. As known to one of ordinary skill, the memory 232 can include both volatile and non-volatile components that store an operating system, hardware interface drivers, software applications, and other data.

In particular, the platform 130 includes a voice-recognition unit (VRU) 234 that is typically implemented with both software and hardware components. As is conventionally known, a VRU 234 receives speech input (such as through the radio interface 238) and processes it. The processing involves digitizing the speech and performing vocabulary analysis and/or natural language processing to determine what words are being spoken. The VRU 234 then formats the "words" in a format that is useful by a computer to perform further queries. Conversely, the computer platform 130 also includes an audio output interface 236 that receives digitized input from the microprocessor 230 and produces audio-formatted output to relay through the radio interface 238.

The radio interface 238 operates at an appropriate frequency within its intended environment and at an appropriate power level to communicate with a wireless headset 140 worn by an operator. The headset 140 typically has a microphone for receiving speech data from the operator and a speaker for producing audio output for the operator. The wireless headset 140 has an appropriate transceiver to communicate with the radio interface 238 of the platform 130.

The platform 130 also includes a wireless network interface 240 for communicating with the computer 130, one such conventional wireless protocol is the 802.11b standard; although, other alternative wireless protocols may be used. Once voice input is received and processed by the VRU 234, the information is sent to the computer 130 where it is received and forwarded to the computer 110 and the DBMS 112. In the reverse direction, information received from the computer 110 over the wireless interface 234 is processed by the audio output interface 236 and relayed to the wireless headset 140.

In one embodiment of the present invention, a bar-code scanner 242 is included within the computer platform 130. Alternative interfaces such as an RFID tag reader (not shown) are contemplated as well. The bar-code scanner 242 is useful to scan encoded information while the operator is nearby the storage units 102-108. For example, an item to be placed in the storage unit 102 may have an encoded label. The operator would scan the label and then receive an audio prompt of where to place the item. Thus, the operator is prevented from mistakenly misidentifying the item when speaking its identification. In another instance, quantity labels may be positioned near the bar-code scanner 242 so that the operator simply scans the label for A6" when that quantity of an item is being stored.

Figure 3:
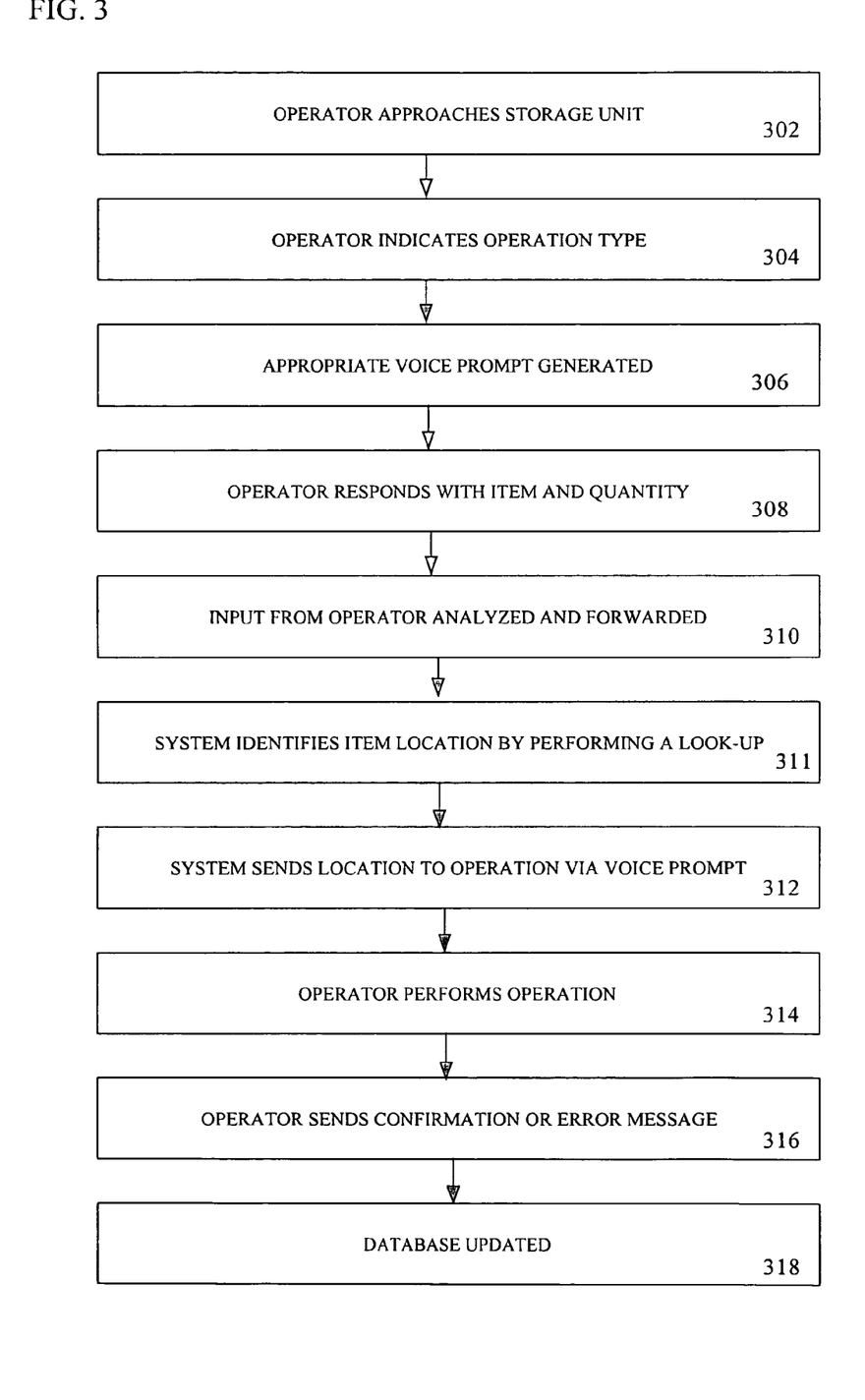
FIG. 3 depicts a flowchart of an exemplary method using a voice-enable interface to operate an automated storage unit.

FIG. 3 depicts an exemplary flowchart for utilizing the automated storage system 100 of FIG. 1 in conjunction with the computer platform 130 of FIG. 2. In describing the following method, the specific environment of a warehouse picker is described; however, this is an exemplary environment and is not meant to limit the application of the present invention. Other environments can include large record rooms, laboratories, and assembly plants.

In step 302, an operator wearing the headset 140 approaches a storage unit 102 that includes the computer platform 130 of the present invention. The platform 130 may automatically detect the proximity of the headset 140 and initiate communications with the headset or wait for the operator to speak before performing any actions. For example, if the operator spoke into the headset 140 a command such as "Ready", then the computer platform 130 responds by establishing an interactive session with the computer 110. The computer 110 may then passively wait for more information from the computer platform 130 or actively send back a prompt such as "Please Proceed" which is output to the operator via the headset 140.

In step 304, the operator identifies whether the operation to be performed is a "retrieval" or a "placement". In other words, the operator states whether he intends to take an item from a storage location or put an item into a storage location. Alternatively, the bar-code scanner 242 may be used to scan an appropriate near-by label that indicates what operation is going to be performed. In response, the computer 110 will generate a prompt, in step 306, that requests the item identifier and quantity. The prompt is relayed to the computer platform 130 and output as audio output via the headset 140. The audio prompts received via the headset 140 mimic the prompts that the operator would see if he were sitting at the computer 110. Thus, the prompts might be a series of individual prompts or one prompt that receives multiple items in response. The interface application 114 is responsible for generating an audio prompt that mimics the DBMS front-end and for formatting a speech response from the operator into a format that the front-end can utilize.

In response to hearing the audio prompt, the operator speaks, in step 308, the item identifier and quantity into the headset 140. The computer platform 130 receives this information and forwards it, in step 310, to the computer 110 via the wireless network interfaces 240 and 115. In addition, or as an alternative, to speaking the item identifier and quantity, the operator may use the bar-code scanner 242 to identify the item and/or the quantity. Part of the forwarding of the information in step 310 includes analyzing any speech data received from the operator and performing voice recognition and analysis. One of ordinary skill would recognize that the VRU functionality may be performed by the computer 110 if the computer platform 130 simply relays the speech input to the computer 110. However, as described earlier, the VRU 234 is advantageously located at the computer platform 130 and analyzes the speech input so that the computer 110 is not burdened with this task. Thus, the data received by the interface application 114 is in a format useful by the DBMS 112.

In step 311, the DBMS 112 receives the item identifier information and performs a look-up into the database 120 to determine the location for that item. In an item placement operation, the location may simply be the next available bin in a storage unit. Although, if one or more of that item are already stored, then that particular location may be returned as the appropriate location. Similarly, for an item retrieval operation from the storage system, the database is searched to determine where that item is located. Accordingly, regardless of the specific operation being performed, the DBMS 112 operates in such a manner as to identify a bin location in step 311.

In step 312, the bin location information is sent to the operator via the headset 140. In particular, the DBMS 112 forwards the information to the interface application 114 so that it can be transmitted over the wireless network connection. Once at the computer platform 130, the location information is sent as audio output over the radio link to the headset 140 and produced out its speaker.

As a result, the operator is able to locate the correct bin easily and quickly. In those instances in which automated storage units are used that automatically position the carousel, the storage units 102-108 may still be controlled this way via the link 111. Otherwise, the operator will manually control the storage units 102-108 so that the appropriate bin is located at the opening 134. Thus, in step 314, the operator performs the intended operation such as placing or picking an item.

Once the operation is performed, the operator sends a confirmation message, in step 316, to the computer 110. The confirmation message may simply mean speaking a command such as "Confirmed". If the operation was not successful (e.g., the requested item was not in the bin, or the bin was not empty), then the operator can send a message such as "Unsuccessful". A variety of different error handling procedures can then be implemented. For example, the operation may be repeated to ensure that the item was not simply misidentified. Alternatively, the computer 110 may guide the operator through a series of prompts such as identifying what was in the selected bin. In addition to voice confirmation, the bar-code scanner 242 may be utilized to scan one label for "successful" and another label for "unsuccessful".

Once the operation is performed and confirmed, the system inventory has effectively changed and needs to be updated. Thus, in step 318, the computer 110, through the DBMS112, updates the database 120 to reflect the current state of the inventory within the storage system 100. The operator, in step 304, can now initiate a new operation by simply speaking into the headset 140. He is no longer required to travel back to the computer 110 to initiate a new operation.

Thus, an automated storage system has been described that provides a two-way wireless interface between an operator and the database system that identifies where items are located. Accordingly, while the operator is located adjacent a storage unit, the operator can query the database system for an item location via speech input and receive audio output of that location. As a result, the operator does not need to remember the location information while traveling between a computer and the storage unit and the operator is able to perform multiple operations with the storage unit without returning to the computer in-between each operation.

Thus, while the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

For example, the connection between the computer platform 130 and the computer 110 is frequently referred to as a wireless network connection. However, other embodi-

What is claimed is:

1. A method for placing an item in an automated storage unit having a plurality of individual defined areas for containing items, the method comprising the steps of:
   receiving voice input utilizing a headset, the voice input relating to an item identifier for an item in a defined area of the automated storage unit for the purpose of placing the item in the automated storage unit;
   in response to the voice input, interfacing with a control computer coupled to a database that is reflective of the automated storage unit, the control computer using the item identifier information and database to generate location information for the item that is reflective of an individual defined area of the automated storage unit, and outputting, to the headset, a voice prompt indicative of a location in the automated storage unit;
   receiving a status message, through the headset, regarding placement of the item in the defined area in the unit.

2. The method of claim 1, further including the step of:
   receiving bar code information from one of a bar code scanner or an RFID reader relating to an item identifier for an item.

3. The method of claim 1, wherein the step of receiving voice input further includes the step of:
   performing speech recognition on the voice input.

4. The method of claim 1, wherein the voice input further comprises information related to a quantity of an item.

5. The method of claim 1, further comprising the step of:
   sending the status message to the control computer.

6. The method of claim 1, wherein the step of receiving the status message further includes the step of:
   receiving the status message as speech data.

7. The method of claim 1, wherein the status message comprises one of a confirmation of the item being placed in the automated storage unit, and a report of an error when placing the item in automated storage unit.

8. A method of retrieving an item in an automated storage unit having a plurality of individual defined areas for containing items, the method comprising the steps of:
   using a headset, capturing a voice input of a user relating to an item identifier for an item in a defined area of the automated storage unit;
   transmitting the item identifier through a wireless interface to a controller of the automated storage unit;
   in response to transmitting the item identifier, interfacing with a database coupled to the controller that is reflective of the automated storage unit and generating location information for the item that is reflective of an individual defined area of the storage unit; and
   outputting a voice prompt, through the headset, that is indicative of the location information.

9. The method of claim 8, further comprising the step of:
   capturing input regarding an item by receiving information from one of a bar code scanner or an RFID reader.

10. The method of claim 8, wherein the step capturing voice input further includes the step of:
    performing speech recognition on the voice input.

11. The method of claim 8, further comprising the steps of:
    receiving a confirmation related to retrieving the item; and
    transmitting the confirmation to the controller.

12. The method of claim 11, wherein the step of receiving the confirmation further includes the step of:
    receiving the confirmation as a voice input.

13. A voice-controlled automated storage system including an automated storage unit having a plurality of individual defined areas for containing items, comprising:
    an input device including a headset configured to receive voice input indicative of an item identifier of an item in a defined area of the automated storage unit;
    an interface coupled with the input device and in communication with a controller of the automated storage unit so as to forward the item identifier to the controller, the controller accessing a database reflective of the automated storage unit and generating location information for the item identifier that is reflective of an individual defined area of the storage unit; and
    an output device coupled with the interface and controller and configured to produce a voice output related to the location information for the item in the automated storage unit.

14. The voice-controlled interface of claim 13, wherein the headset of the input device includes a microphone configured to capture audio input.

15. The voice-controlled interface of claim 13, wherein the input device includes at least one of a bar-code scanner or an RFID reader.

16. The voice-controlled interface of claim 13, wherein the interface is configured to:
    transmit the item identifier to the controller; and
    in response, receive location information from the controller related to the location for the item.

17. The voice-controlled interface of claim 13, wherein:
    the input device is further configured to receive a voice confirmation relating to the item; and
    the interface is further configured to transmit an indication of the confirmation to the controller.

18. The voice-controlled interface of claim 17, wherein the indication is based on speech recognition analysis of the voice confirmation.

19. An automated storage system, comprising:
    an automated storage unit having a plurality of individual defined areas for containing items;
    a control computer coupled with the storage unit via a wireless interface, the control computer in communication with a database reflective of the automated storage unit;
    at least one headset configured to receive voice input indicative of an item identifier for an item in a defined area of the automated storage unit and to forward the item identifier information via the wireless interface to the control computer, the headset further configured to receive a voice output; and
    the control computer, in response to input of the item identifier information, operable to generate location information for an item that is reflective of an individual defined area of the storage unit and to forward a voice output, indicative of the location information, to the headset.

20. The system of claim 19, wherein the voice input is indicative of a quantity.

21. The system of claim 19, further comprising:
    at least one of a bar code scanner or an RFID reader configured to provide the item identifier.

22. The system of claim 19, wherein:
    the control computer is configured to operate the automated storage unit in accordance with the item identifier.

23. The system of claim 19, wherein the control computer is configured to update the database, in response to input of the item identifier.

24. The system of claim 19, wherein the headset is further configured to receive a status message and forward the status message to the control computer.

25. The system of claim 19, wherein the status message is a confirmation of a successful storage unit operation.

26. The system of claim 19, wherein the status message is indicative of an unsuccessful storage unit operation.

* * * * *

UNITED STATES PATENT AND TRADEMARK OFFICE
CERTIFICATE OF CORRECTION

| | | |
|---|---|---|
| PATENT NO. | : 7,316,354 B2 | Page 1 of 1 |
| APPLICATION NO. | : 10/798466 | |
| DATED | : January 8, 2008 | |
| INVENTOR(S) | : Michael Davis | |

It is certified that error appears in the above-identified patent and that said Letters Patent is hereby corrected as shown below:

On the Title Page, Item (56) "6,600,418 Sainati et al" should be -- 6,600,418 Francis et al --
    Column 2, line approximately 34, "include features" should be -- includes features --
    Claim 10, Column 7, line 57, "the step capturing" should be -- the step of capturing --

Signed and Sealed this
Eighth Day of March, 2011

David J. Kappos
*Director of the United States Patent and Trademark Office*